United States Patent [19]

Storey, Jr. et al.

[11] 3,746,971
[45] July 17, 1973

[54] SAMPLE SPINNING CELL FOR NMR OF FLOWING SYSTEMS

[75] Inventors: William H. Storey, Jr., Houston; Daniel A. Montalvo, San Antonio, both of Tex.

[73] Assignee: The United States of America as represented by the Secretary of the Army, Washington, D.C.

[22] Filed: Apr. 3, 1972

[21] Appl. No.: 240,618

[52] U.S. Cl. ............................................. 324/0.5 R
[51] Int. Cl. ............................................. G01n 27/78
[58] Field of Search ...................... 324/0.5 R, 0.5 A, 324/0.5 AR, 0.5 B

[56] References Cited
UNITED STATES PATENTS
2,960,649  11/1960  Bloch ................................. 324/0.5
3,085,195  4/1963  Anderson .......................... 324/0.5

Primary Examiner—Michael J. Lynch
Attorney—Harry M. Saragovitz, Edward J. Kelly et al.

[57] ABSTRACT

There is described a sample spinning cell for nuclear magnetic resonance of flowing systems consisting of a tubular housing provided with offset ports at its closed ends through which the sample liquid stream flows and impinges on the blades of a turbine assembly pivotally mounted in said housing whereby the turbine rotates at a speed determined by the flow rate of the stream. The turbine blades which are integral with a hollow cylindrical housing direct the sample liquid into said housing wherein it is formed into a spinning column which passes the nuclear magnetic resonance receiving coil mounted on the tubular housing and subsequently to a discharge port. Affixed in the hollow cylindrical housing is a sealed double wall cylindrical container containing a referencing solution and completely surrounding the spinning column.

5 Claims, 3 Drawing Figures

PATENTED JUL 17 1973 3,746,971
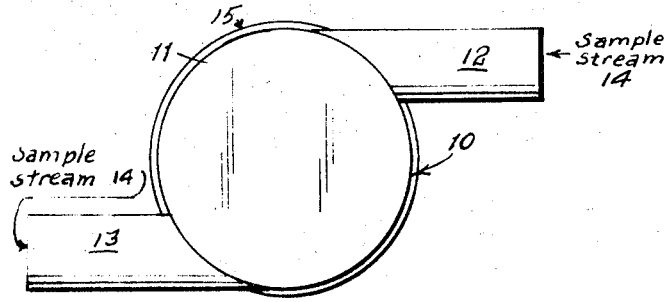
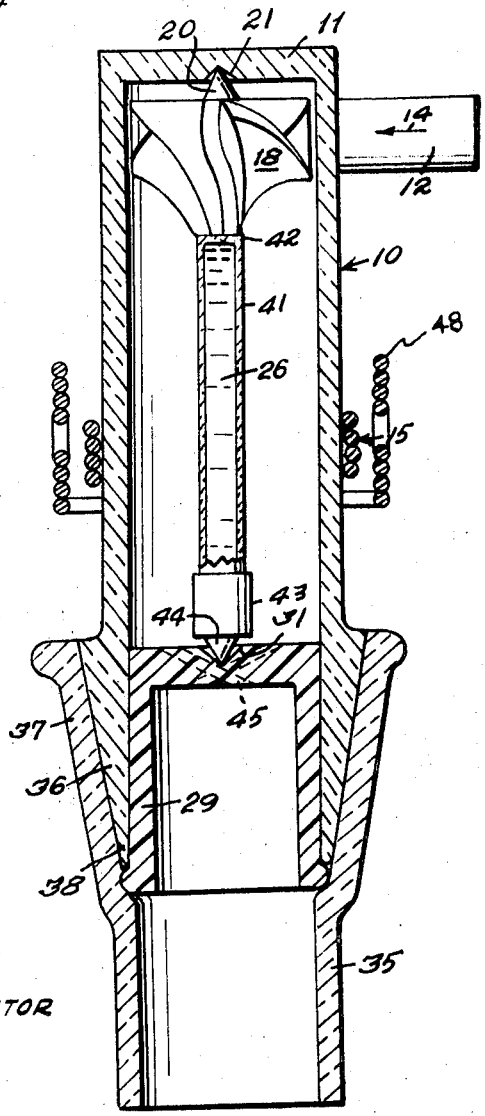
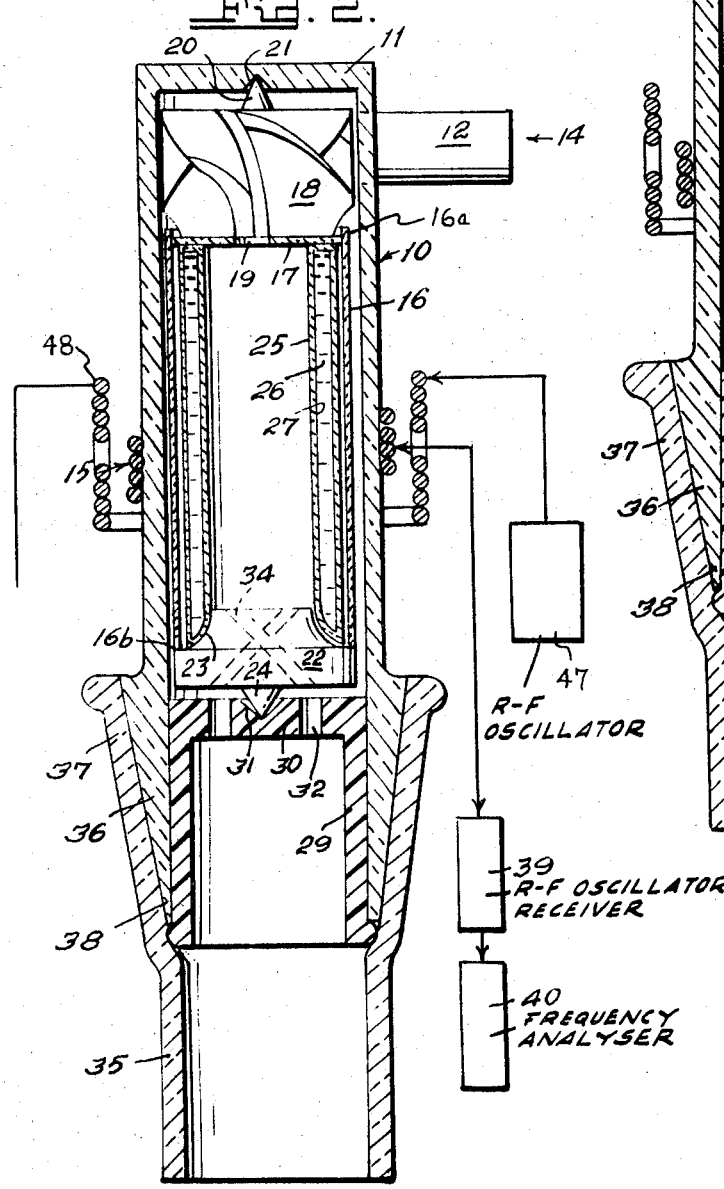

SAMPLE SPINNING CELL FOR NMR OF FLOWING SYSTEMS

High resolution nuclear magnetic resonance measurements are frequently limited by several factors, one of which is the inhomogeneity of the applied magnetic field in a plane normal to the sample axis. It has become routine to effect an improvement in the effective homogeneity by spinning the sample tube about its longitudinal axis which, a process which effectively averages the local field variations. Usually, the sample cell is located in a holder which is connected to the shaft of a gas driven turbine which rotates the cell 20–30 revolutions sec$^{-1}$ so as to effectively reduce the half width of the resonance signal and thereby increase the signal to noise ratio of the signal.

In the application of nuclear nagnetic resonance to process control or monitoring, it is frequently necessary to pass the sample through the sample tube in a continuous flowing stream which is a process that is very difficult to make compatible with the usual procedure for sample spinning. Further, a standard nuclear magnetic resonance reference signal from such compounds as benzene, tetramethylsilane, etc. is required to be continuously available to allow continuous reference of environment. The reference signal, in order to be useful, must be displayed simultaneously with the spectrum of the sample being measured. In prior art devices referencing is accomplished either through the use of an internal reference added to the sample or by an external reference enclosed in a separate section of the sample cell. The latter is carried out using closed-fitting coaxial sample cells in which the reference sample is placed in the annulus between the cells. It has been found that such prior art devices do not provide for enhancement of the nuclear magnetic resonance signal to noise ratio and present inherent difficulties in referencing a flowing liquid sample.

Accordingly an object of the invention is a sample spinning cell for nuclear magnetic resonance of flowing systems which allows the application of high resolution nuclear magnetic resonance to closed flowing liquid samples while simultaneously introducing spinning in order to reduce the field inhomogeneity, and including an external reference.

Another object of the invention is a sample spinning cell for nuclear magnetic resonance of flowing systems wherein is produced equivalent signal to noise enhancement for both the flowing sample and the reference compound.

Another object of the invention is a unitary sample spinning cell for nuclear magnetic resonance of flowing systems wherein the flowing sample and reference compound are simultaneously rotated therein without resort to external motive force.

The novel features that are considered characteristic of the invention are set forth with particularity in the appended claims. The invention itself, however, both as to its organization and method of operation as well as additional objects and advantages thereof will be best understood from the following description taken in conjunction with the accompanying drawings in the several figures of which like numerals identify like elements and in which:

FIG. 1 is a plan view of the invention;

FIG. 2 is a longitudinal cross sectional view of the invention; and

FIG. 3 is a longitudinal cross sectional view of another embodiment of the invention.

Referring now to the drawings and particularly to FIGS. 1 and 2 wherein reference character 10 generally indicates a hollow cylindrical glass housing formed with a closed end 11 and two tangentially disposed opposed laterally spaced ports 12 and 13 in the cylindrical wall of the housing adjacent the end 11. A sample stream 14 of any liquid containing hydrogen nuclei is coupled in a well known manner to ports 12 and 13 and passes therethrough to the interior of the housing 10 where it, inter alia, impinges on the blades of a turbine rotatably mounted in housing 10.

The turbine consists of a hollow glass cylinder 16 having affixed therein adjacent end 16a a disk or base 17 supporting a multiplicity of turbine blades 18 which extend beyond the end 16a and which are provided with a pivot 20 affixed to the tops of the blades at their center juncture. The blades 18 are curved in a manner that the stream 14 after impinging thereon is directed through openings 19 formed in the base 17 between the blades and hence into housing 16. A cylindrical plastic plug 22 is fabricated with a reduced section whereby an annular shoulder 23 is formed at the periphery thereof intermediate its ends. The plug 22 is releasably assembled to end 16b of cylindrical housing 10 with its reduce section positioned inwardly of housing 10 whereby the shoulder 23 contacts end 16b and forms therewith a seal. A pivot 24 is affixed to the bottom of plug 22 exteriorally of cylinder 16. Diagonally disposed passages 34 in plug 22 which extend therethrough provide means for passage of the liquid of the sample stream from the interior of cylinder 16 to the exterior thereof. A hollow double well sealed cylindrical glass container 25 which contains a referencing solution 26 in the annulus 27 formed by its walls is releasably positioned in cylinder 16 between disk 17 and the annular shoulder 23 of plug 22. The turbine with container 25 and plug 22 assembled thereto is inserted in housing 10 so that its pivot 20 engages a pivot bearing 21 affixed centrally in the inside surface of end 11 whereby blades 18 are placed in cooperative relationship with the ports 12 and 13. A hollow cylindrical plastic spacer 29 formed with a closed end 30 which is provided with a centrally located pivot bearing 31 in the outside surface thereof is inserted closed end first in the open end 38 of cylinder 10, in frictional engagement with the wall thereof, a predetermined distance which permits engagement of its pivot bearing 31 and pivot 24. Thus the turbine with the housing 25 is rotatably supported between closed end 11 and spacer 29. The closed end 30 of spacer 29 has formed therein a multiplicity of spaced perforations 32 which extend therethrough in cooperative alignment with the diagonally disposed passages 34 of plastic plug 22 whereby the liquid discharged through the diagonally disposed passages 24 flows through the perforations 32 into a detachable tubular glass joint 35 to be returned therefrom to a chemical system, not shown. The wall of cylinder 10 adjacent end 38 thereof is provided with an inwardly directed tapered section 36 whose outside surface is ground whereby a friction fit is obtained with the ground interior surface of the flared mouth 37 of the detachable glass joint 35 whereby the spinning cell is coupled to the return of said system.

In operation, the liquid sample stream 14 from a chemical system, not shown, enters at offset ports 12 and 13 in housing 10 and impinges on the blades 18 causing the turbine with the referencing solution affixed therein to rotate at a speed determined by the flow rate of the liquid. Turbine blades 18 direct the liquid impinging thereon down through openings 19 in the blade supporting base 17 into cylinder 16 of the turbine whereupon as it progresses therethrough it is effectively formed into a spinning column which passes the rotating referencing solution 26 region and the receiving coil 15 region to passages 34 where it is drained from cylinder 16 and returned to the system through apertures 32 in the plastic spacer via detachable joint 35. From the foregoing it can be seen that simultaneous rotation of the flowing liquid sample and of the referencing solution is attained in a simple single device, thus producing equivalent signal to noise ratio enhancement for both while at the same time obviating the necessity of an external force to cause simultaneous rotation of these liquids.

A radio-frequency oscillator means 47 is coupled to transmit coils 48 to provide a signal that interacts with the referencing solution 26 and liquid sample stream 14, each of which displaces the signal in frequency in accordance with its nuclei density to produce two frequency displaced signals which are coupled via receiving coil 15 to the radio-frequency oscillator-receiver means 39, the output of which may be coupled to frequency analyzing means 40 for observing the frequency spectrums of these signals. The frequency displacement thus obtained is characteristic of the concentration of the nuclei concentration of the sample stream.

FIG. 3 illustrates another embodiment of the invention wherein the spatial position of the referencing solution 26 and sample stream 14 is reversed. In this embodiment the referencing solution 26 is contained in a sealed hollow glass cylinder 41 which has formed integral with its end 43 the turbine blades 18 and at its opposite end 43 a pivot 44. This assembly is pivotally supported in housing 10 between closed end 11 and open end 38 thereof by means of pivot 30 in engagement with pivot bearing 21 in closed end 11 and pivot 43 in engagement with pivot bearing 31 in the plastic spacer 29 which is now provided with diagonally disposed passages 45 to permit the sample stream to drain from cylinder 10. In operation, blades 18 are caused to rotate under the influence of sample stream 14 whereby sealed container 41 rotates therewith causing the referencing solution 26 to rotate about the longitudinal axis of housing 10 while at the same time the sample stream 14 which is directed downwardly into housing 10 by blades 18 spirals around the rotating referencing solution 26 in cylinder 41 and through receiving coil 15 region to the diagonally disposed passages 45 in spacer 29 whereupon it passed therethrough for return to said chemical system.

We claim:

1. A sample spinning cell for nuclear magnetic resonance of flowing systems wherein suitable rotation of the flowing liquid sample and of the reference solution produce equivalent signal to noise ratio enhancement for both without the employment of external motive force to cause said rotation comprising in combination:

a hollow cylindrical glass housing adapted to be connected to a chemical system whereby a flowing liquid sample stream containing hydrogen nuclei of unknown density is admitted thereto;

means rotatably fixed in said cylindrical housing supporting means containing a reference solution of known hydrogen nuclei density therein and responsive to said flowing liquid sample to direct said flowing liquid sample through said housing and simultaneously cause rotation of said flowing liquid sample and said reference solution in spaced relationship to each other in said housing;

radio-frequency transmit coils with radio-frequency oscillator means coupled thereto for producing a signal which interacts with the simultaneously rotating liquid sample and reference solution whereby frequency displaced signals are generated having a frequency displacement there-between characteristic of the nuclei density of the flowing liquid sample; and radio-frequency receiving means on said cylindrical housing for detecting the displaced signals.

2. The invention in accordance with claim 1 wherein said cylindrical glass housing is formed with a closed end and oppositely disposed offset ports in the cylindrical wall thereof adjacent said closed end whereby said flowing liquid is coupled and admitted to said housing and wherein said means rotatably fixed in said housing comprises turbine means substantially extending throughout the length of said housing and pivotally supported therein along the longitudinal axis thereof with its blades in cooperative relationship with said ports and thereby adapted to cause rotation of said turbine in response to said flowing liquid and to direct said flowing liquid through said housing wherein in the passage therethrough it is formed into a spinning column of said liquid.

3. The invention in accordance with claim 2 wherein said turbine means comprises in combination a second cylindrical glass housing adapted to fit within said cylindrical glass housing;

a disk affixed in said second housing adjacent a first end thereof supporting spaced turbine blades curved towards said ports and formed with apertures between said blades through which said blades direct said flowing liquid into said housing while causing rotation of said turbine in reaction to said flowing stream;

first pivot means affixed to the top of said blades at their point of intersection along the longitudinal axis of said second housing adapted to engage a pivot bearing means formed in the said closed end of said housing;

detachable spacer-sealing means affixed in a second end of said housing having a reduced section directed inwardly thereof and provided with passages therethrough whereby said flowing liquid is drained from said housing.

4. The invention in accordance with claim 3 wherein said means containing a reference solution of known hydrogen nuclei density comprises in combination:

a double wall hollow cylindrical container consisting of a first hollow glass cylinder and a second hollow glass cylinder coaxial with said first cylinder and forming therebetween an annulus in which said reference solution is contained, and means sealing the ends of said coaxial cylinders together whereby said reference solution is retained in said annulus, said double wall hollow cylindrical container supported in said second cylindrical glass housing and rotatably therewith at one end by means of said disk and at the opposite end by means of said detachable spacer-sealing means whereby said reference solution is positioned intermediate said spinning column of said liquid and said receiving coil.

5. A sample spinning cell for nuclear magnetic resonance of flowing systems wherein suitable rotation of the flowing liquid sample and of the reference solution produce equivalent signal to noise ratio enhancement for both without the employment of external motive force to cause said rotation comprising in combination:
a hollow cylindrical glass housing provided with a closed end and oppositely disposed offset ports in the cylindrical wall thereof adjacent said closed end whereby said flowing liquid is coupled and admitted to said housing;
turbine means for simultaneously rotating said reference solution on the longitudinal axis of said housing and spiralling said flowing liquid around said reference solution consisting of a hollow sealed glass shaft containing said reference solution and having turbine blades affixed to one end thereof and pivotally supported in said housing along the longitudinal axis thereof with said blades operatively positioned in regard to said ports and adapted in response to said flowing liquid to cause rotation of said reference solution and spiralling of the flowing liquid around said reference solution in the annulus formed by the shaft and the interior surface of said housing;
a receiving coil wound on the exterior surface of said housing intermediate its ends, and
means for drawing the flowing liquid from said housing.

* * * * *